United States Patent
Kato

(12) United States Patent (10) Patent No.: US 11,450,863 B2
Kato (45) Date of Patent: Sep. 20, 2022

(54) CO-MOLDED COMPONENTS OF A REDOX FLOW BATTERY STACK

(71) Applicant: STRYTEN CRITICAL E-STORAGE LLC, Alpharetta, GA (US)

(72) Inventor: Garrett Scott Kato, Arvada, CO (US)

(73) Assignee: STRYTEN CRITICAL E-STORAGE LLC, Alpharetta, GA (US)

(*) Notice: Subject to any disclaimer, the term of this patent is extended or adjusted under 35 U.S.C. 154(b) by 108 days.

(21) Appl. No.: 16/714,171

(22) Filed: Dec. 13, 2019

(65) Prior Publication Data

US 2020/0194809 A1 Jun. 18, 2020

Related U.S. Application Data

(60) Provisional application No. 62/779,261, filed on Dec. 13, 2018.

(51) Int. Cl.
*H01M 8/0263* (2016.01)
*B29C 45/14* (2006.01)
*B29L 31/34* (2006.01)

(52) U.S. Cl.
CPC ........... *H01M 8/0263* (2013.01); *B29C 45/14* (2013.01); *B29L 2031/3468* (2013.01)

(58) Field of Classification Search
CPC ............. B29C 45/14; B29C 45/1671; B29L 2031/3468; H01M 8/0263; H01M 8/0273; H01M 8/0284; H01M 8/188; H01M 8/2455; H01M 8/2459; H01M 8/2483
See application file for complete search history.

(56) References Cited

U.S. PATENT DOCUMENTS

2017/0012308 A1* 1/2017 Ikeuchi ............... H01M 8/188
2017/0324108 A1* 11/2017 Yamaguchi ......... H01M 8/0271
2019/0157700 A1* 5/2019 Bitner ............... H01M 8/04201

FOREIGN PATENT DOCUMENTS

WO WO-2017174053 A1 * 10/2017 ........ H01M 8/04186

* cited by examiner

*Primary Examiner* — Adam A Arciero
(74) *Attorney, Agent, or Firm* — Cantor Colburn LLP

(57) ABSTRACT

A cell plate assembly of a redox flow battery has a frame body and a cell plate in fluidic communication. Cell plates, electrolyte pathways and other components of the frame plate assembly may be overmolded inside a frame. Plates, frames and tubes may all be robustly sealed. One piece bonded plug and frames enable reduced use of O-rings and other wear items.

13 Claims, 15 Drawing Sheets

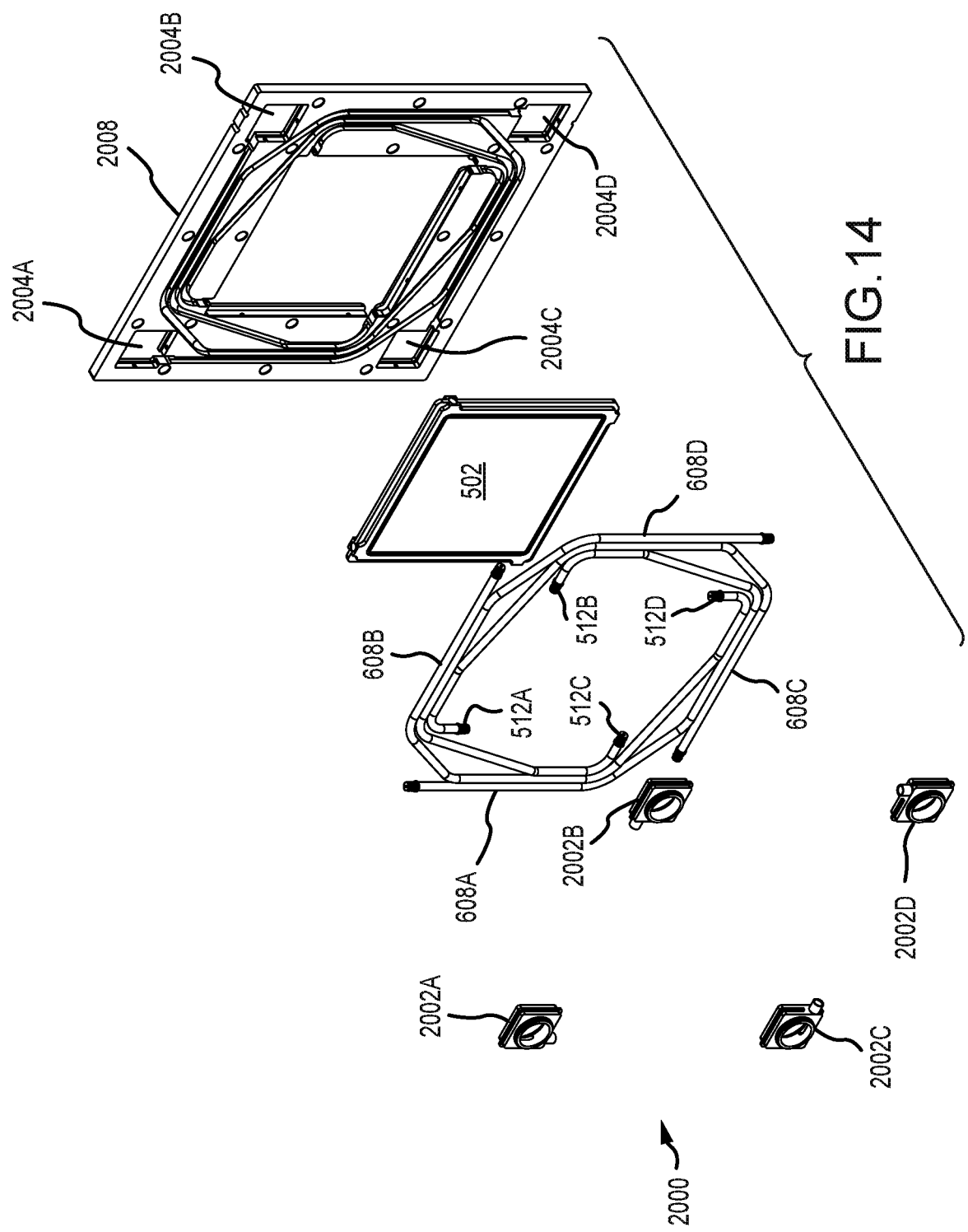

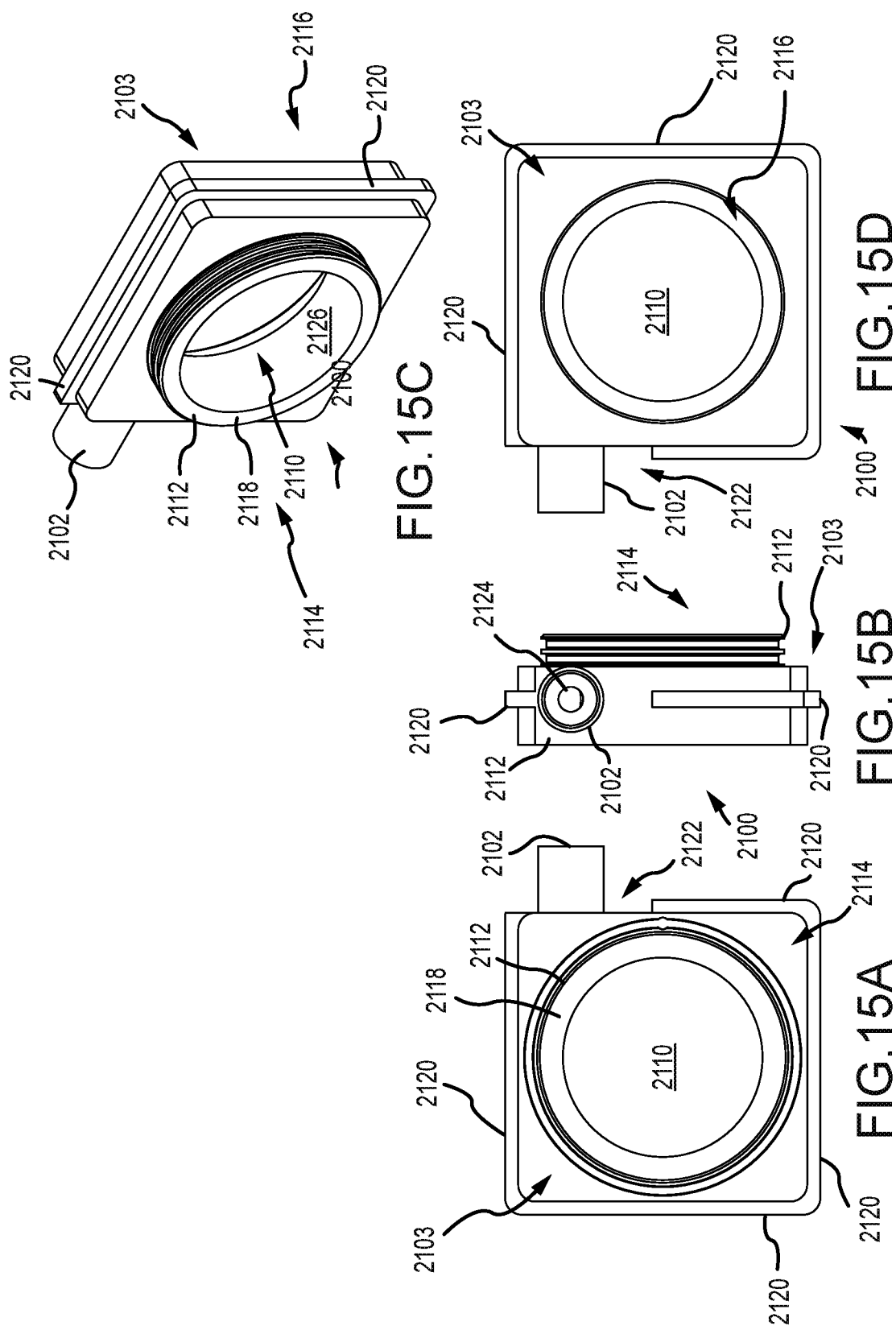

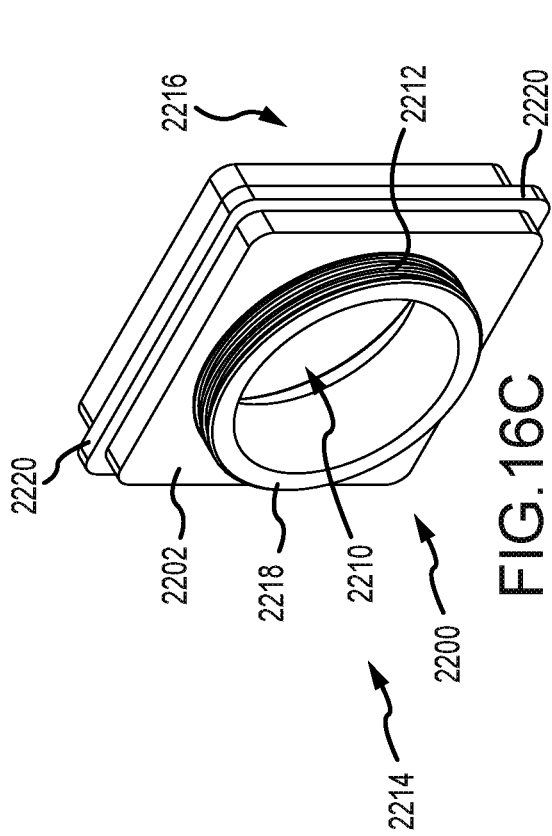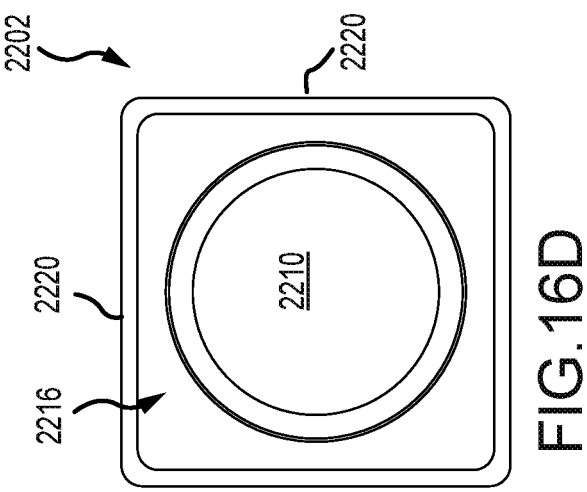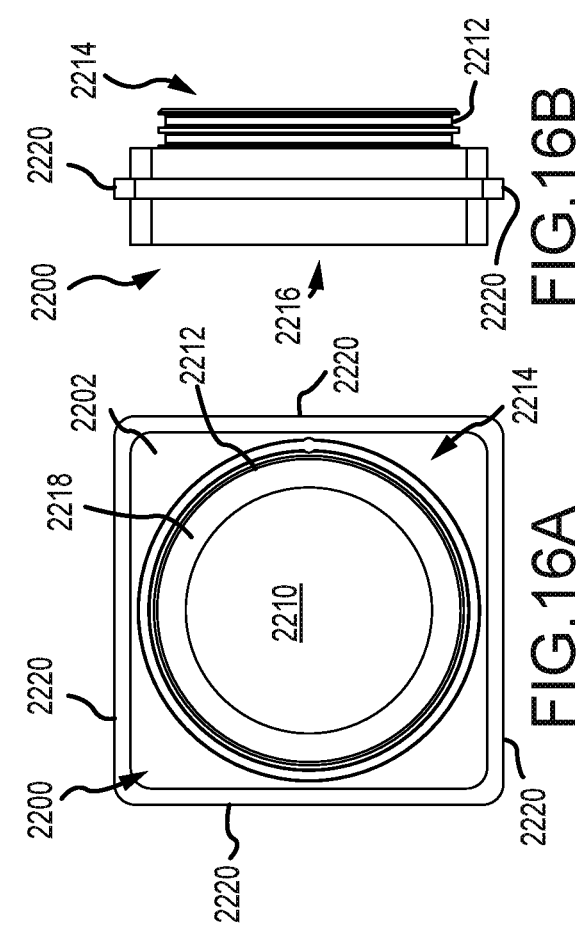

CO-MOLDED COMPONENTS OF A REDOX FLOW BATTERY STACK

INTRODUCTION

A rechargeable flow battery (e.g., a redox flow battery) stores chemical energy in electrolyte solutions that contain electro-active elements. Conversion of this chemical energy to electrical energy may be captured and used to power a variety of devices and/or delivered to a power grid.

A typical rechargeable flow battery will have one or more cells. The cell will have an anolyte solution portion and a catholyte solution portion. These portions are separated by a membrane. Reservoirs containing additional anolyte and catholyte solutions are fluidically coupled to the anolyte portion and catholyte portion of the cell, respectively. As each electrolyte solution is circulated through its respective portion of the cell, the membrane allows for proton exchange between the anolyte solution and the catholyte solution. A current collector (e.g., an electrode) transfers the energy associated with the electron exchange between the anolyte and the catholyte to or from a power source depending on whether the redox-flow battery is being charged or discharged.

Current redox flow technology is limited by several issues. For example, maintenance of wear-parts, prevention of cross contamination of electrolyte solutions between cells (and between the portions of a cell), and reduction of manufacturing costs continue to be challenging with current redox flow technology.

It is with respect to these and other considerations that aspects of the technology have been disclosed. Also, although relatively specific problems have been discussed, it should be understood that the technology disclosed herein should not be limited to solving the specific problems identified in the background or the disclosure.

Redox Flow Battery

Aspects of the technology relate to a redox flow battery with a cell plate and a frame, which together form a frame plate assembly. In embodiments, multiple frame plate assemblies are stacked together to form a cell stack. The cell plates are fluidically coupled to the frame of the frame plate assembly. Electrolyte pathways and other components of the frame plate assembly may be overmolded such that the components inside the frame. Additionally, plates, frames, and pathways may all be robustly sealed.

Methods of manufacture include over molding a cell plate and/or other elements of the frame plate when molding the frame body. That is, component parts of a frame-plate assembly, may be disposed within a frame plate. Plastic injection molding or other techniques may be used to form a mold around the cell plate (and other inserts, such as tubing for electrolyte pathways and frame channel inserts). These and other methods of manufacturing may result in the cell plate, electrolyte tubing, and frame channels being disposed within the frame during molding.

These and various other features as well as advantages that characterize the systems and methods described herein will be apparent from a reading of the following detailed description and a review of the associated drawings. Additional features are set forth in the description which follows, and in part will be apparent from the description, or may be learned by practice of the technology. The benefits and features of the technology will be realized and attained by the structure particularly pointed out in the written description and claims hereof as well as the appended drawings.

BRIEF DESCRIPTION OF THE DRAWINGS

Non-limiting and non-exclusive embodiments are described with reference to the following figures.

FIG. 14 illustrates various views of an embodiment of frame channel component for overmolding.

FIGS. 15A-15D illustrate various views of an embodiment of a component that may be used in an over molding process.

FIGS. 16A-16D illustrate another example component that may be used in an over molding process.

DETAILED DESCRIPTION

Aspects of the technology relate to one or more of the components of a frame plate assembly co-molded within a frame. For example, cell plates, frame channels, electrolyte pathways, and other components may be co-molded with the frame.

Co-molding allows for, in aspects of the technology, a one-piece configuration that reduces the use of O-rings and other connection items that wear down during use. These points of connection, which may not seal properly or may wear under normal battery operating conditions, may cause failure or reduce service life. For example, a cell plate of a redox flow assembly may be sealed, using the overmolding techniques described herein, to an electrolyte pathway rather than coupling to the electrolyte pathway through the use of snap fit or other connectors. In additional/alternative embodiments, the electrolyte pathways and the frame channels may be integrated inside the frame using the overmolding technique.

Figure 1:
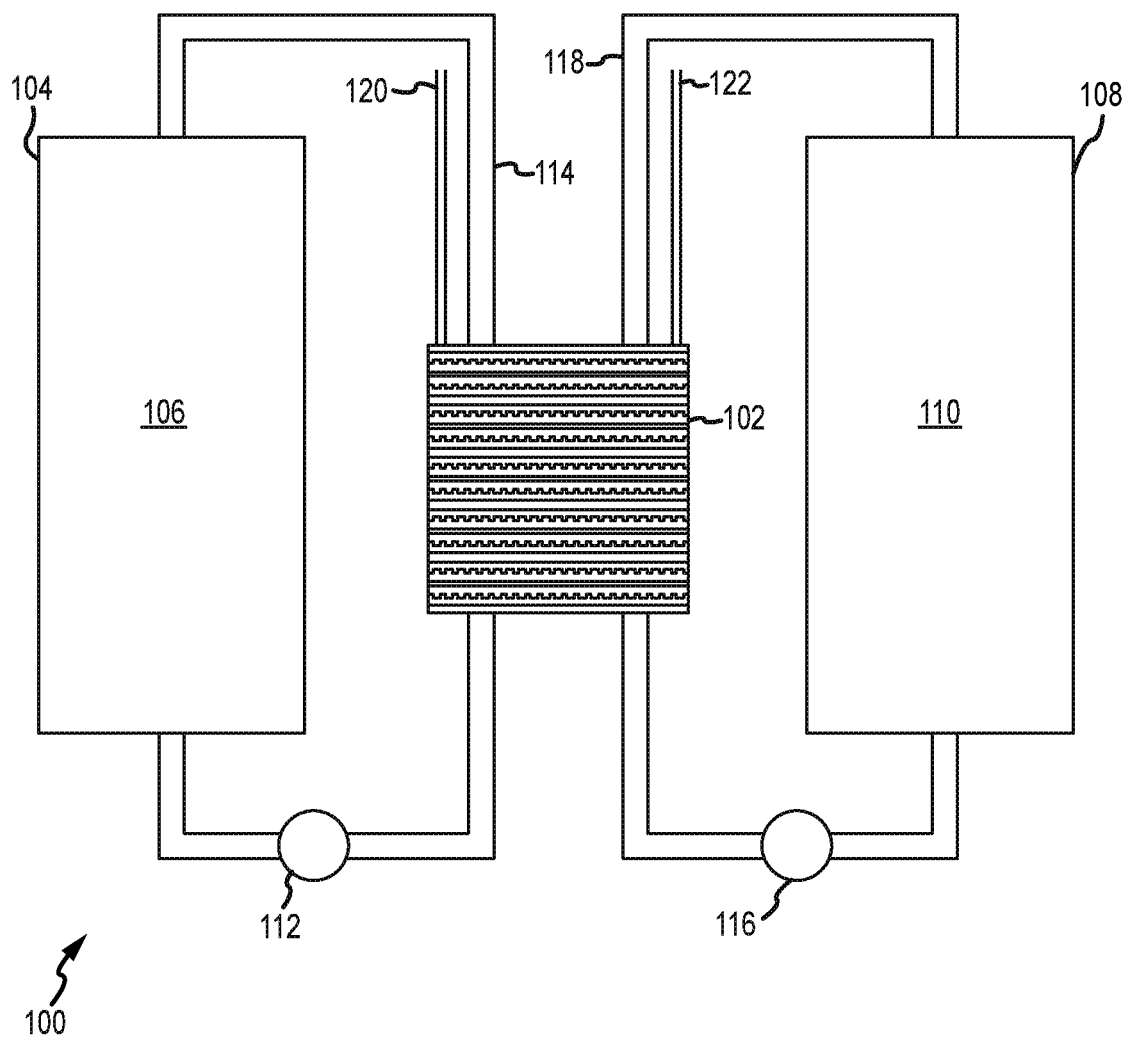
FIG. 1 illustrates an embodiment of a redox-flow battery system having a cell stack.

FIG. 1 illustrates an embodiment of a redox-flow battery system 100 having a cell stack 102. As illustrated, redox-flow battery system 100 also includes a catholyte reservoir 104 holding a catholyte solution 1106 and an anolyte reservoir 108 holding an anolyte solution 110. Additionally, catholyte current collector 120 and anolyte current collector 122 are present, as is a first pumping mechanism 112 to circulate the catholyte solution 116 from the catholyte reservoir 102 to the cell stack 1102, and a second pumping mechanism 116 to circulate the anolyte solution 110 from the anolyte reservoir 108 to the cell stack 102.

In an embodiment, the redox-flow battery system 100 may be one of a vanadium-vanadium redox flow battery, a polysulfide bromide battery, an iron-chromium battery, or a manganese-vanadium redox flow battery. In an embodiment where the redox-flow battery system 100 is a vanadium redox flow battery, the catholyte solution 106 is substantially $V^{5+}$ in the charged state. Additionally, where the battery is in the charged state, the anolyte solution 110 is substantially $V^{2+}$. In an embodiment where the system is a polysulfide bromide battery, the catholyte solution 106 is substantially sodium tribromide, and the anolyte solution 110 is substantially sodium disulfide in a charged state. In an embodiment where the system is an iron-chromium battery, the catholyte solution 106 is substantially $Fe^{3+}$, and the anolyte solution 110 is substantially $Cr^{2+}$ in a charged state. In an embodiment where the system is a manganese-vanadium battery, the catholyte solution 106 is substantially $Mn^{3-}$, and the anolyte solution 110 is substantially $Vn^{2+}$ in a charged state. It will be appreciated that the technologies described herein may be used with other redox-flow battery chemistries.

A cell stack 102 may include a plurality of cell plates. Each cell plate of the cell stack 102 facilitates the exchange of electrical energy between the catholyte and the electrolyte during a charge/discharge cycle. A cell plate, which includes a proton exchange membrane positioned between the two electrodes, allows the transfer of a proton from the catholyte to the anolyte during the discharge cycle, and a current collector facilitates the exchange of an electron from the anolyte to the catholyte during the discharge cycle. The cell stack 102 may have cells that are in series or are in parallel. While only one cell stack 102 is illustrated, it will be appreciated that multiple cell stacks may be electrically coupled together in either series or parallel.

In an embodiment, one or more mechanical pumps are used as a first pumping mechanism 112 and a second pumping mechanism 116 to circulate the catholyte solution 106 and the anolyte solution 110, respectively. Other methods and/or equipment may be used to provide circulation of the catholyte solution 106 between the catholyte reservoir 104 and the cell stack 102, as well as to circulate the anolyte solution 110 between the anolyte reservoir 108 and the cell stack 102.

As illustrated, the catholyte reservoir 104 is fluidically coupled to the cell stack 102 by a catholyte pathway 114 (which may be a tube, a pipe, or the like), and the anolyte reservoir 108 is fluidically coupled to the cell stack 102 by an anolyte pathway 118 (which may be a tube, a pipe, or the like). It will be appreciated that one or more cell stacks 102 may be configured to be fluidically coupled together in series and/or parallel.

Figure 2:
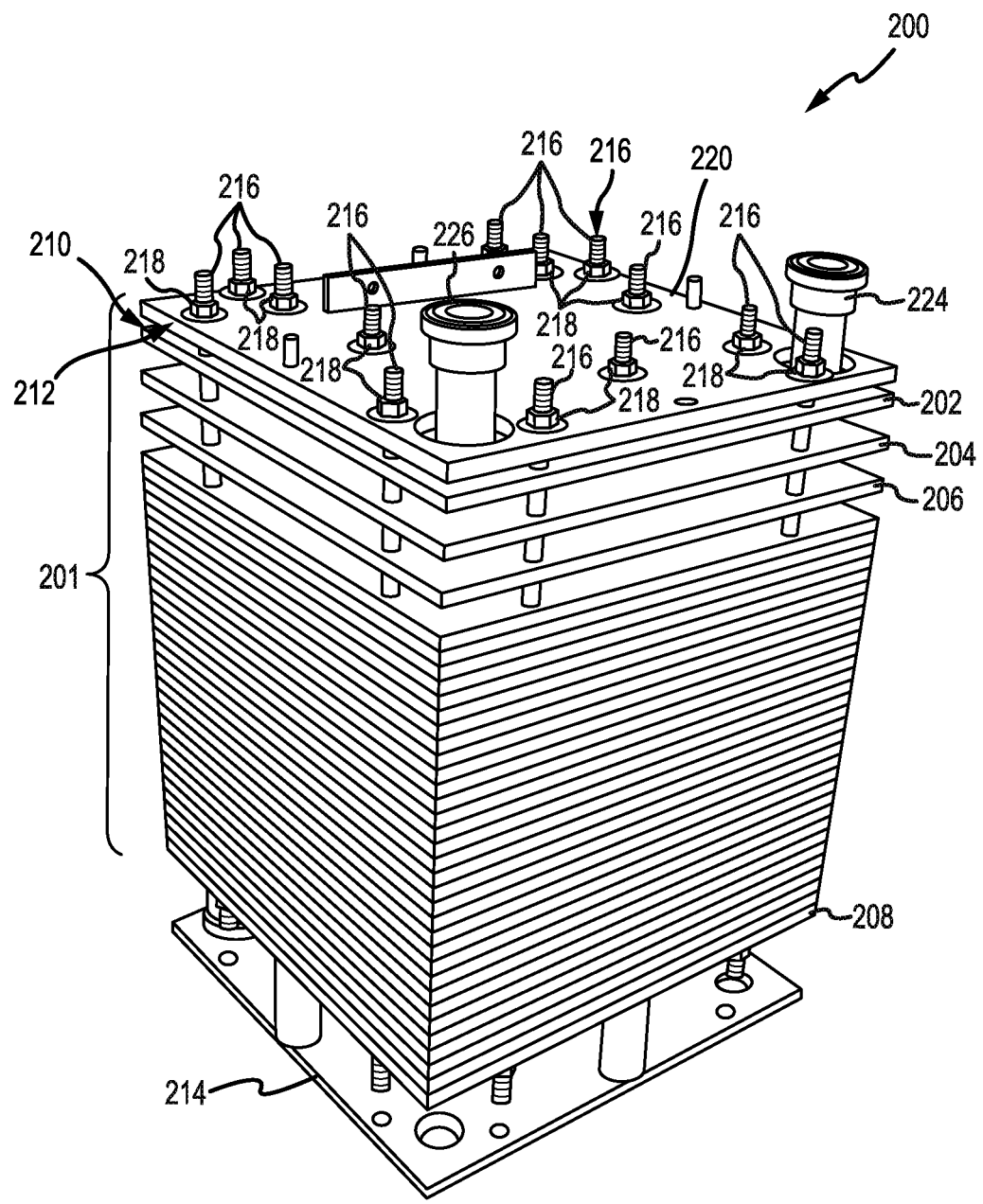
FIG. 2 illustrates an exploded-perspective view of a cell stack system.

FIG. 2 illustrates an exploded-perspective view of a cell stack system 200. In aspects of the technology, cell stack system 200 includes a plurality of frame plate assemblies 201, which includes a first frame plate assembly 202, a second frame plate assembly 204, and a third frame plate assembly 206. As illustrated, each frame plate assembly, such as the first frame plate assembly 202, the second frame plate assembly 204, and the third frame plate assembly 206, are rectangular prisms, though they need not be.

It will be appreciated that each frame plate assembly has a front face and a back face as described further below. For example, the first frame plate assembly 202 has a front face and a back face. In aspects of the technology, the front face and the back face are substantially planar.

In aspects of the technology, the back face of the first frame plate assembly 202 is disposed proximate to the front face of the second frame plate assembly 204, the back face of the second frame plate assembly 204 is disposed proximate to the front face of the third frame plate assembly 206, and so on. A first frame plate assembly 202 includes, in embodiments, a frame and a cell plate (e.g., a monopolar or bipolar plate comprising carbon paper electrodes and a membrane), which cell plate is used to facilitate the charging/discharging of a redox flow battery. Various embodiments of frame plate assembly are discussed in further detail with reference to figures herein.

The plurality of frame plate assemblies 201 may be coupled together using one or more framing members. For example, the back face of the first frame plate assembly 202 may be coupled to the front face of the second frame plate assembly 204 using one or more framing members, the back face of the second frame plate assembly 204 may be coupled to the front face of the third frame plate assembly 206, and so on.

Coupling may occur through a variety of means. As illustrated, the plurality of frame plate assemblies 201 are coupled together using framing rods 6 The framing rods 216 orthogonally penetrate the front face and the back face of the first frame plate assembly 202. The framing rod is a type of framing member. In aspects of the technology, the framing members may be rods, plates, walls, shafts, and/or any item capable of coupling each of the plurality of frame plate assemblies 201 to adjacent frame plate assemblies. In aspects of the technology, the first frame plate assembly 202 has a plurality of bores operable to receive the plurality of framing rods 218. Additionally, fasteners 218 couple the framing rods 216 to the first frame plate assembly 202. Though the illustrated fasteners 218 are bolts that couple to a threaded end of the framing rods 216, it will be appreciated that other fastening technology is contemplated.

Similarly, the second frame plate assembly 204 has a plurality of bores, which bores may be aligned with the bores of the first frame plate assembly 202 such that the plurality of framing rods 216 may be received. In alternative embodiments, other framing members may be used. The other frame plate assemblies in the plurality of frame plate assemblies 201 may have similarly aligned bores to receive the framing rods 216. As such, each frame plate assembly of the plurality of frame plate assemblies 201 may couple to the adjacent frames by sliding over the framing rods 218.

As illustrated, the plurality of framing rods 216 may be secured to a first mounting plate 212. The first mounting plate 212 may cap the top of the plurality of frame plate assemblies 201. That is, the first mounting plate 212 may be disposed on the front side of the first frame plate assembly 202. Similarly, a second mounting plate 214 may cap a last frame plate assembly 216 of the plurality of frame plate assemblies 201, the last frame plate assembly 216 being disposed at the opposite end of the plurality of frame plate assemblies 201 from the first frame plate assembly 202.

Additionally illustrated in FIG. 2 is electrolyte piping 224 and 226. The electrolyte piping fluidically couples an electrolyte reservoir, such as an anolyte reservoir or catholyte reservoir, to the plurality of frame plate assemblies 201. As illustrated, the electrolyte piping 224 and the electrolyte piping 226 penetrate through the first frame plate assembly 202 through an angle orthogonal to the front face and the back face. The electrolyte piping 224/226 may deliver and/or return the electrolyte solution to each frame plate assembly in the plurality of frame plate assemblies 201.

The reservoirs may be the same as or similar to the electrolyte reservoirs described with references to FIG. 1. In aspects of the technology, each frame plate assembly is designed with a pathway such that an electrolyte solution may pass from the frame of a frame plate assembly to a cell plate of the frame plate assembly, and then to another frame plate assembly, and then ultimately to an electrolyte reservoir.

Figure 3A:
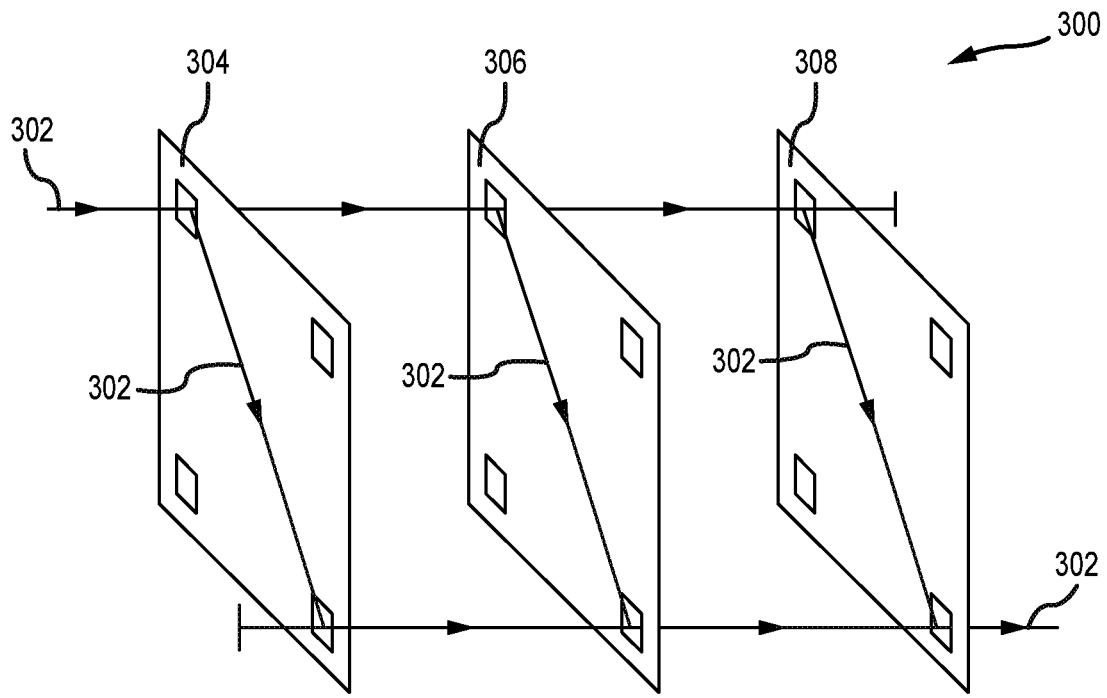
FIGS. 3A and 3B illustrate an example electrolyte pathway between multiple frame plate assemblies of a redox cell stack.

FIG. 3A illustrates an example catholyte pathway between multiple frame plate assemblies of a redox cell stack 300. In aspects of the technology, a catholyte solution 302 enters a first frame plate assembly 304.

The first frame plate assembly 304 may have a frame with a variety of channels, vias, membranes, porous material, and/or pathways to direct the flow of the catholyte solution 302 across a portion of the backside of the first frame plate assembly 304. In aspects, flow may be directed through a frame of the first frame plate assembly 304 into a cell portion of the first frame plate assembly 306. In aspects of the technology, flow into the cell portion of the first frame plate assembly 304 is directed across a backside of the membrane of the cell portion of the first frame plate assembly 304. Flow of the catholyte solution may be directed such that a laminar sheet-flow occurs across the backside of a membrane of a cell portion of the first frame plate assembly 304.

The catholyte solution 302 then proceeds to enter a second frame plate assembly 306. In aspects of the technology, the frame of the second frame plate assembly includes channels, vias, membranes, porous materials, and or/pathways to direct the flow of the catholyte solution 302 across a portion of a backside of the second frame plate assembly. Flow of 302 may enter and exit the frame plate assembly 306 in a similar manner as frame plate assembly 304. In aspects, flow may be directed through a frame of the second frame plate assembly 306 into a cell portion of the second frame plate assembly. In aspects of the technology, flow into the cell portion of the second frame plate assembly 306 is directed across a backside of the membrane of the cell portion of the second frame plate assembly 306. Flow of the catholyte solution 302 may be directed such that a laminar sheet-flow occurs across the backside of a membrane of the cell portion of the second frame plate assembly 306.

This pattern of flow of the catholyte solution 302 may proceed to a plurality of other frame plate assemblies, including a third frame plate assembly 308, and/or to a reservoir. Flow of 302 may enter and exit the frame plate assembly 308 in a similar manner as frame plate assembly 304. In aspects of the technology, the catholyte solution 302 enters a frame plate assembly and flow may be directed such that the catholyte solution flows down a backside portion of the membrane of a cell portion of a plate assembly.

Figure 3B:
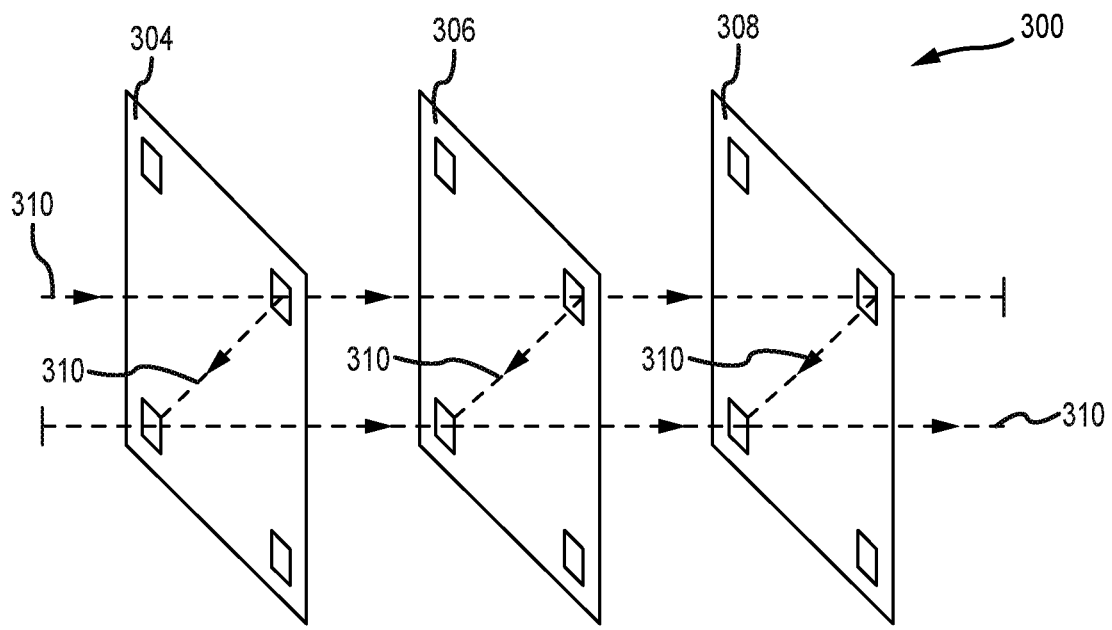

Illustrated in FIG. 3B is a flow of an anolyte solution 310. An anolyte solution may travel from a first frame plate assembly 304 to the second frame plate assembly 306. The second frame plate assembly 306 may have a frame with a variety of channels, vias, membranes, porous material, and/ or pathways to direct the flow of the anolyte solution 310 across a portion of the front side of the second frame plate assembly 306. In aspects, flow may be directed through a frame of the second frame plate assembly 306 into a cell portion of the second frame plate assembly 306. In aspects of the technology, flow into the cell portion of the second frame plate assembly 306 is directed across a front side of the membrane of the cell portion of the second frame plate assembly 306. Flow of the anolyte solution 310 may be directed such that a laminar sheet flow occurs across the front side of the membrane of the cell portion of the second frame plate assembly 306.

The anolyte solution 310 then proceeds to enter a third frame plate assembly 308. Flow of the anolyte solution 310 may enter and exit the frame plate assembly 308 in a similar manner as frame plate assembly 304. In aspects of the technology, the frame of the third frame plate assembly 308 includes channels, vias, membranes, porous materials, and or/pathways to direct the flow of the anolyte solution 310 across a front side of the third frame plate assembly 308. In aspects, flow may be directed through a frame of the third frame plate assembly 306 in a cell portion of the third frame plate assembly 308. In aspects of the technology, flow into the cell portion of the third frame plate assembly 308 is directed across a front side of the membrane of the cell portion of the third frame plate assembly 308. Flow of the anolyte solution 310 may be directed such that a laminar sheet flow occurs across the front side of a membrane of the cell portion of the third frame plate assembly 308.

This pattern of flow of the anolyte solution 310 may proceed to a plurality of other frame plate assemblies and/or to a reservoir. In aspects of the technology, the anolyte solution 310 enters a frame plate assembly and flow may be directed such that the anolyte solution flows down a backside portion of the membrane.

In aspects of the technology, the electrolyte solutions flow to each cell plate in a stack through a shared manifold. That is, in an example, each cell includes a flow path that enables an electrolyte to flow from an inlet to an outlet, and each frame plate assembly has an internal manifold insert, such as electrolyte piping 226 and 224. Thus, stacking multiple frame plate assemblies may create a common supply and return manifolds via the electrolyte piping. This internal manifold supplies and returns electrolyte to the individual cells in a parallel flow configuration, in example embodiments. Other configurations are contemplated.

Figure 4:
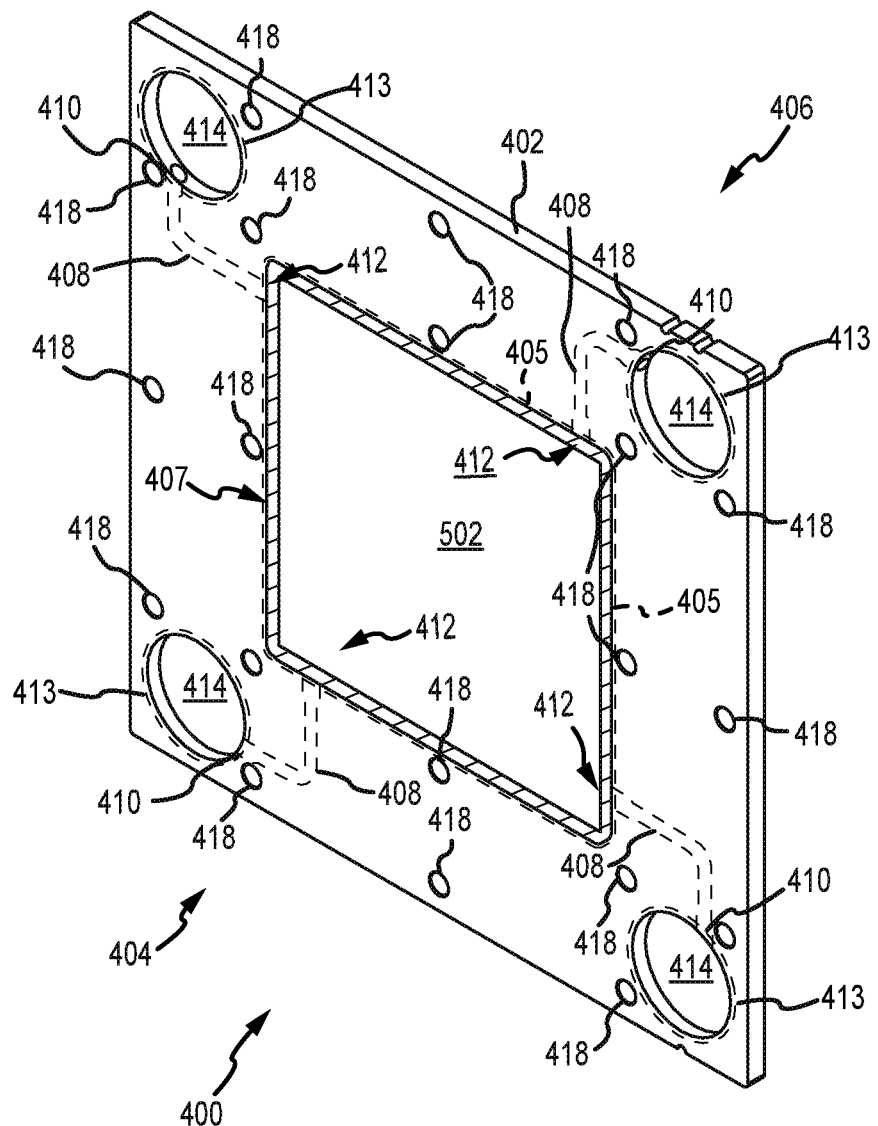
FIG. 4 illustrates a perspective view of an example of a frame suitable for co-molding.

FIG. 4 illustrates a perspective view of an example of a frame plate assembly 400 with a co-molded cell-plate 400 and co-molded frame channels 408. The dashed lines indicate where components are present, though not necessarily visible. For example, a dashed lined may indicate that a component of a frame-plate assembly, such as the electrolyte pathway, is integrated within the frame body 402. As illustrated, the frame 400 has a frame body 402 that is a rectangular prism.

Additionally illustrated are electrolyte pathways 408. Electrolyte pathways 408 fluidically couple an electrolyte reservoir and/or other frame plate assemblies to the frame 400. For example, one or more of the electrolyte pathways 408 may be a catholyte supply pathway that delivers a catholyte solution to a cell plate, a catholyte return pathway that returns a catholyte solution to a catholyte reservoir and/or other frame plate assemblies, an anolyte supply pathway that delivers an anolyte solution to a cell plate, and/or an anolyte return pathway that returns an anolyte solution to an anolyte reservoir and/or other frame plate assemblies. As illustrated, the electrolyte pathways 408 are dotted lines, indicating that they are present, though not visible, in the perspective view illustrated. The electrolyte pathways 408 may be formed through a variety of means, including tubing inserts, overmolding, lost wax, or a gas assist.

The electrolyte pathways 408 each have a frame channel end 410 and a cell end 412. The frame channel end 410 fluidically couples the electrolyte pathways 408 to a frame channel 414. The frame channel end 410 may be an orifice that allows an electrolyte solution to flow from the frame channel 414 into an electrolyte pathway 408. Other structural items that allow the electrolyte pathways 408 to be in fluidic communication with a reservoir and/or other frame plate assemblies are contemplated. As illustrated, the frame channel 414 is a component that has been overmolded within the frame body 402 to form a unitary construction with the frame. For example, the edges 413 of the frame channel insert are illustrated by a dashed line, indicating that the frame channel insert has been over molded. Similarly, the cell end 412 fluidically couples the electrolyte pathway 408 to a cell plate 502.

Additionally illustrated is a cell plate 502. As illustrated, the cell plate 502 is rectangular prism. The edges of the cell plate 502 are indicated by dashed lines 405, indicating that the edges of the cell plate have been covered, such that at least a portion of the front face 407 of the cell plated 502 is covered by the frame body 402. As illustrated, the at least a portion is the perimeter of the cell plate 502. In examples, the portion includes a portion defined by the edges 405 of the cell plate 502.

The frame body 402 may be of a unitary construction. In aspects of the technology, the frame body 402 is a rectangular prism that is 18.5 inches in width (x), 18.5 inches in length (y), and 0.5 inches in thickness (z). The frame body 402 may be molded of electrically isolating and heat conducting materials, such as a thermally insulating plastic. The frame body 402 may have a cell plate area in which to receive the cell plate 502. The opening may be formed by cutting away an inner section of the frame body 402. In aspects of the technology the opening may be a rectangular in shape so as to accommodate the cell plate 502 that is rectangular in shape, though it need not be. Subsequently, the cell plate 502 may be placed into the opening in preparation to overmold the cell plate into the frame. In other aspects, the opening may be formed during molding of the frame body 402.

Figure 5:
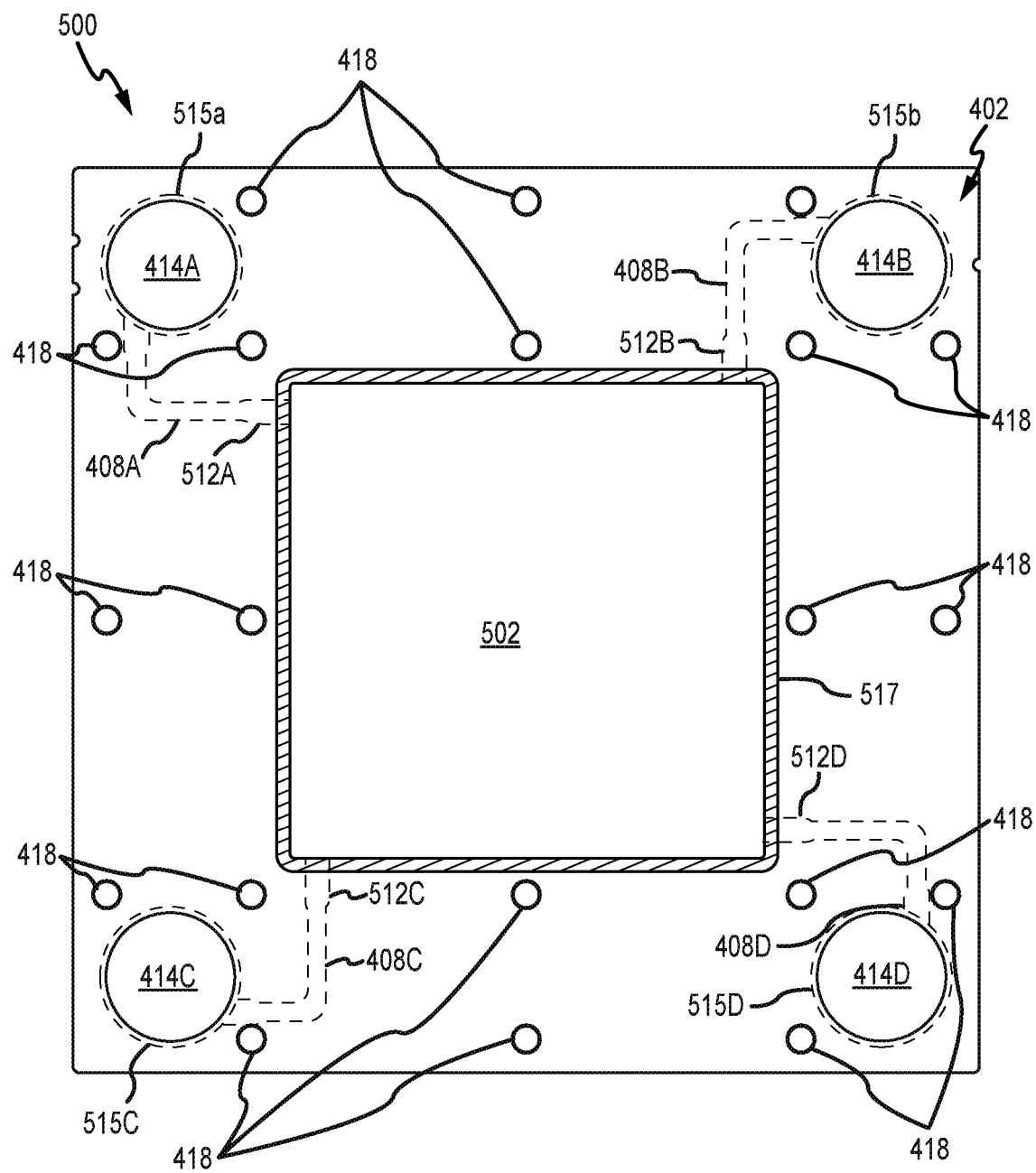
FIG. 5 illustrates a view of a face of a co-molded frame plate assembly.

With reference to FIG. 5, the frame channels 414A, 414B, 414C, and 414D serve to deliver (or return) electrolytes from (or to) a reservoir, such as the reservoirs described with reference to FIG. 1, to a cell plate (e.g., cell plate 502), and/or to adjacent frame plate assemblies within a cell stack. In aspects of the technology, the frame channels 414A, 414B, 414C, and 414D form a tube or channel throughout a plurality of frame plate assemblies within a frame plate assembly. That is, each frame channel may be coupled to another electrolyte frame channel of an adjacent frame to form a tube, pathway, or channel. In aspects of the technology, the frame channels 414A, 414B, 414C, 414D, and/or cell plate are integrated using a joining method. For example, frame channel 414A may be joined to the frame body 402 using a joining material that chemically bonds the edges of a component frame channel to the frame body 402. It will be appreciated that the frame channels 414A, 414B, 414C, and 414D may be formed using the overmolding method as described in further detail below.

In an embodiment of the technology, an electrolyte (such as an anolyte solution or a catholyte solution) may pass from a frame channel 414A through an electrolyte supply pathway 408A to a cell plate 502. Similarly, the opposite charged solution (such as a catholyte solution or an anolyte solution) may enter through frame channel 414B. The opposite charged solution may pass through the electrolyte supply channel 408B to the cell plate 502. An electrolyte return pathway 408C may deliver an electrolyte solution (such as a catholyte solution or an anolyte solution) from the cell plate 502 to frame channel 414C, and on to another frame plate or to a reservoir. Similarly, another integrated electrolyte return pathway 408D returns the opposite electrolyte solution (such as an anolyte solution or a catholyte solution) from the cell plate 502 to frame channel 414C and then on to another floating frame plate assembly or to a reservoir.

The electrolyte supply pathways 408A, 408B, 408C, and 408D may be formed in a variety of ways. In one embodiment, tubing made of material that is substantially inert to the electrolytes are used. An overmolding technique may be used, as provided in further detail below. Where the electrolyte comprises vanadium ions, poly-vinyl chloride, high density polyurethane, and/or polypropylene tubing may be used. In other aspects of the technology, thermal molding or gas assist may be used may be used on the frame body 402 to form one or more of the electrolyte pathways 408A, 408B, 408C, and 408D.

As illustrated, joining members 512A, 512B, 512C, and 512D may couple the electrolyte pathways 408A, 408B, 408C, and 408D to the cell plate 502, respectively. The joining members may be overmolded during the overmolded processes. As illustrated, the joining member 512A fluidically couples the electrolyte supply pathway 408A to the overmolded cell plate 502 such that the frame channel 414A is in fluidic communication with the overmolded cell plate 502. Similarly, the joining members 512B, 512C, and 512D fluidically couple the electrolyte pathways 408B, 408C, and 408D to the cell plate 502, respectively. In aspects of the technology, the joining members 512A, 512B, 512C, and 512D are each nipples made of high density polyethylene.

Additionally, or alternatively, the joining member may be tubing with a press fit, snap fit, threaded connection or other connection such that the joining resiliently engages with a cell plate. Further, the cell plate 502 may have a receiving element adapted to receive a press fit, snap fit, threaded connection or other connection. In additional/alternative embodiments, the joining member may be tubing having any number of flanges that extend radially out from the tubing such that the nipple resiliently engages with the inner surface of the orifice of a cell plate. In aspects, the joining member forms robust coupling with a cell plate. Additionally, the joining member may be incorporated into the cell end of the electrolyte pathways 408A, 408B, 408C, and 408D.

Figure 6:
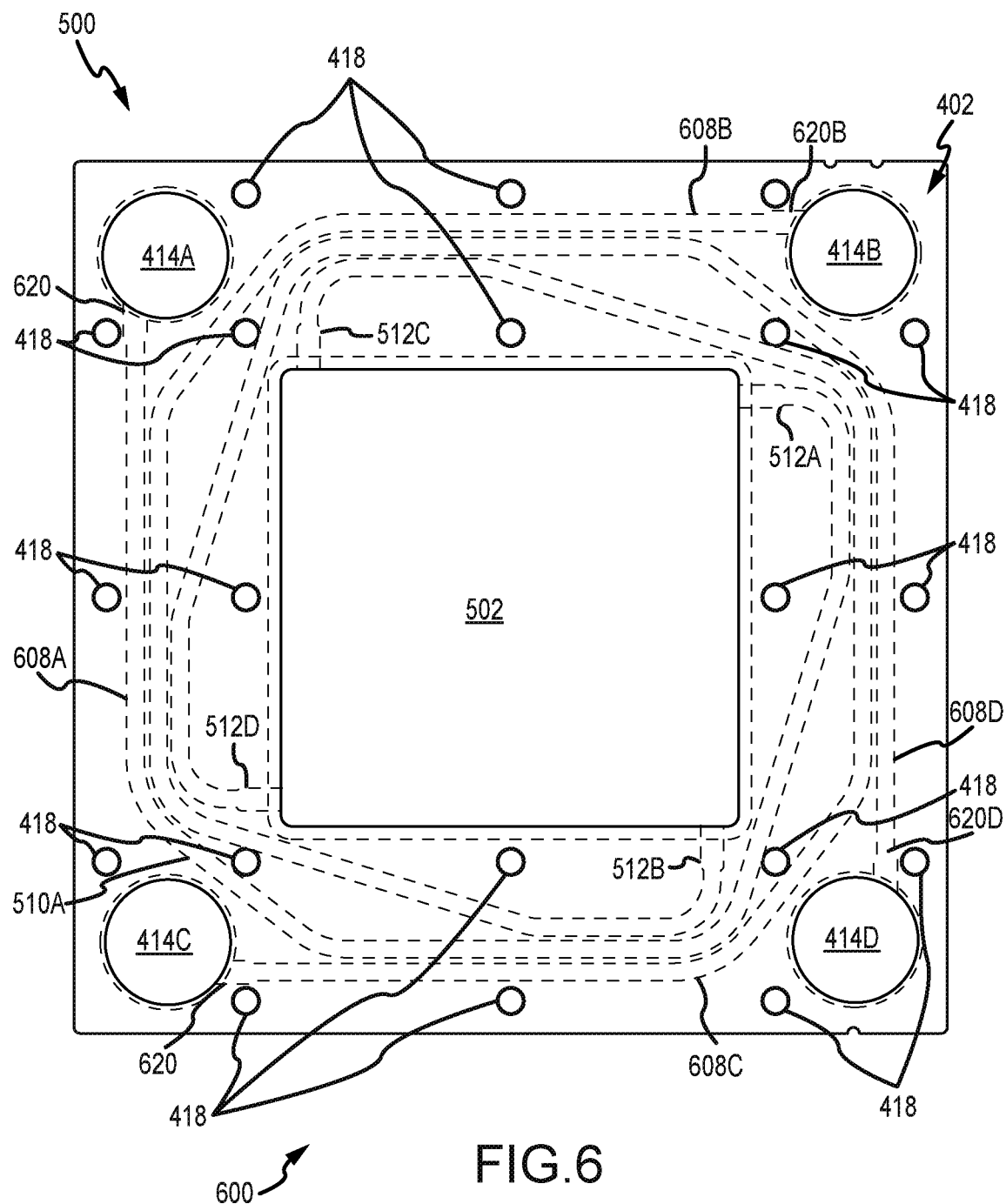
FIG. 6 illustrates a view of a face of a co-molded frame plate assembly with electrolyte pathways.

FIG. 6 illustrates a view of a face of an overmolded frame plate assembly 600 with electrolyte pathways 608A, 608B, 608C, and 608D. It will be appreciated that elements of FIG. 6 that are like numbered as elements previously discussed herein have the same or similar properties as those like numbered elements. As illustrated, overmolded integrated frame plate assembly 600 includes an overmolded cell plate 502, a frame body 402, bores 418, overmolded frame channels 414, and overmolded joining members 512A, 512B, 512C, and 512D.

Overmolded electrolyte pathways 608A, 608B, 608C, and 608D are illustrated. In aspects of the technology, a catholyte or electrolyte solution passes through the overmolded frame channels 414A, 414B, 414C, and 414D and then proceeds to the overmolded electrolyte pathways 608A, 608B, 608C, and 608D, respectively. It will be appreciated that overmolded electrolyte pathways may have similar properties as those describe with respect to electrolyte pathways 408A, 408B, 408C, and 408D. Additionally, in aspects of the technology, the electrolyte solution traverses a specified length of the overmolded electrolyte pathways (e.g., electrolyte pathways 608A, 608B, 608C, and 608D) prior to entering the cell plate 502. The length of path may be tuned to a specific electrical resistance and fluid resistance ratio. For example, in certain applications, it may be desirous to increase electrical resistance to prevent currents within an overmolded frame plate assembly 600 and/or across frame plate assemblies within a cell stack. Additionally, for certain applications, it may be desirous to decrease fluid resistance within an overmolded frame plate assembly 600 and/or across cell assemblies within a cell stack.

In aspects of the technology, electrical resistance is controlled by changing various elements of the overmolded frame plate assembly 600. For example, the material of the overmolded electrolyte pathways, the length of the electrolyte pathways, the size and shape of the electrolyte pathways (e.g., diameter of the electrolyte pathways where the electrolyte pathways is a cylindrical tubing), the material, the size, and the shape of a joining member, and the material, size, and shape of the frame channel nipples (e.g., frame channel nipples 620A, 620B, 620C, and 620D) may alter the electrical resistance in the floating frame plate assembly 600.

Similarly, the fluid flow resistance may be controlled by changing various elements of the overmolded frame plate assembly 600. For example, the material of the electrolyte pathways, the length of the electrolyte pathways, the size (e.g., diameter of the electrolyte pathways where the electrolyte pathways is a cylindrical tubing) and shape (e.g., a electrolyte pathways with an oval cross-section, a rectangular cross section, a circular cross section) of the electrolyte pathways, the material, the size, and the shape of a joining members 512, and the material, size, and shape of the frame channel nipples 620 may alter the fluidic resistance in the floating frame plate assembly 600.

In an embodiment of the technology, the material of the overmolded electrolyte pathways 608A, 608B, 608C, and 608D is one of poly-vinyl chloride, high density polyurethane, or polypropylene. In embodiments, the electrolyte path may be tubular in shape having a defined length and diameter.

As illustrated, overmolded electrolyte pathways 608A, 608B, 608C, and 608D take a corkscrew path around an overmolded integrated cell plate 502, though it need not take such a path. Rather, the electrolyte pathways may take a variety of paths, which may be designed to increase/decrease electrical resistance while decreasing/increasing fluidic resistance. For example, a variety of bends, curves, etc. may be designed to alter the fluid resistance and/or the electrical resistance that an electrolyte solution is subject to during flow within and/or through the floating frame plate assembly 600.

Figure 7:
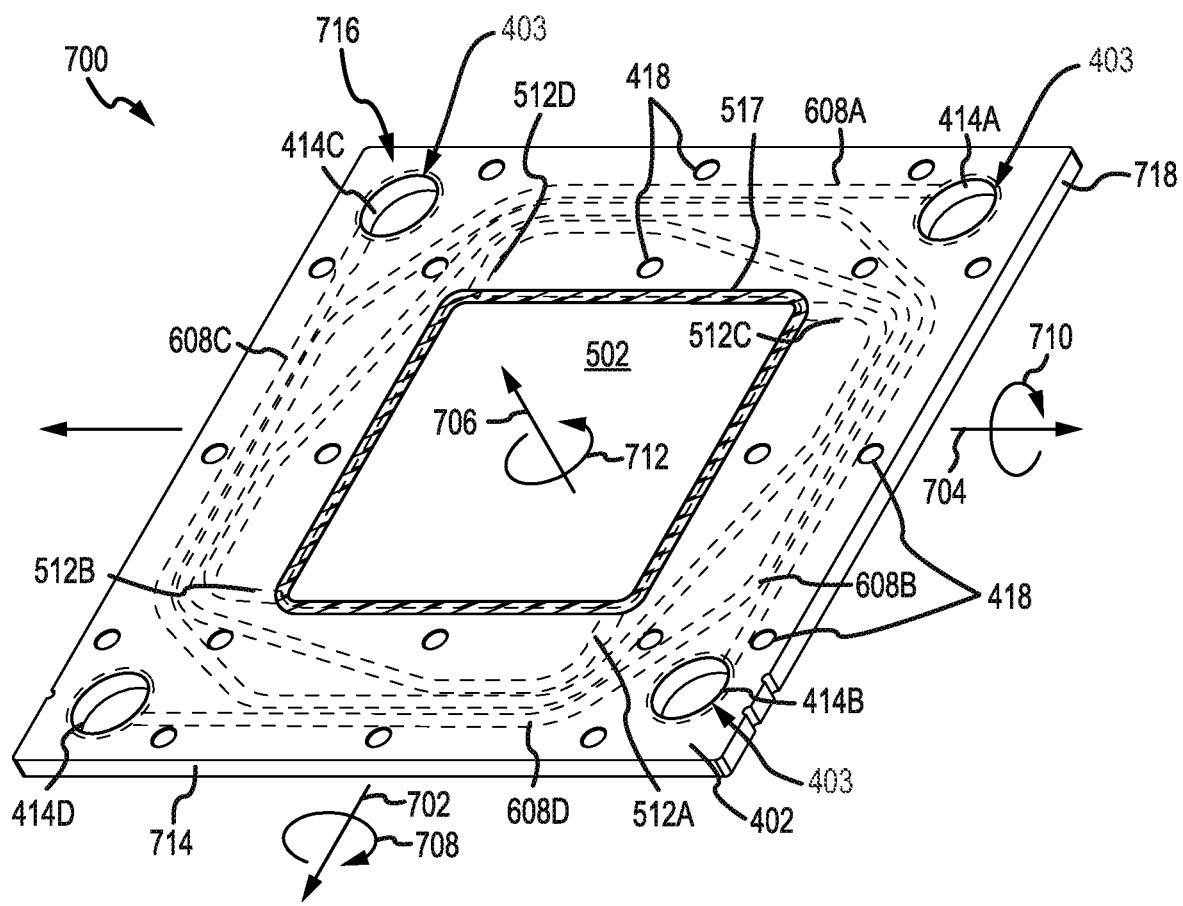
FIG. 7 is a perspective view of a co-molded frame plate assembly frame plate assembly.

FIG. 7 is a perspective view of an overmolded frame plate assembly 700. It will be appreciated that elements of FIG. 7 that are like numbered as those elements previously discussed herein have the same or similar properties as those like numbered elements. As illustrated, an overmolded frame plate assembly 700 includes an overmolded cell plate 502, overmolded frame channels 414A, 414B, 414C, and 414D a frame body 402, electrolyte pathways 608A, 608B, 608C, and 608D and bores 418.

FIG. 7 also illustrates a first horizontal axis 702, a second horizontal axis 704, and a vertical axis 706. A pitch angle 708, a roll angle 710, and a yaw angle 712 are also illustrated. In embodiments, the first horizontal axis 702 is an axis that extends radially out from a first side wall 714 of the floating frame plate assembly 700 and is parallel to the front face 716 of the floating frame plate assembly 700. Additionally, in embodiments, the second horizontal axis 704 extends radially from the second side wall 718 and is orthogonal to the first horizontal axis 702. Further, in embodiments, the vertical axis 706 extends orthogonally outwards from the front face 716 of the overmolded frame plate assembly 700.

In aspects of the technology, the cell-frame overmold material 517 may allow the cell plate 502 to move independently from the frame body 402. Such independent movement allows for, in embodiments, the frame body 402 to be manufactured thinner and manufactured less precisely with respect to flatness and thickness. That is, because the cell plates seal together, the manufacturing tolerances on the sealing elements of each cell plate in a plurality of cell plates must, in embodiments, be sufficiently high to reduce leaking of the electrolyte fluid. Decoupling the movement of the frame body 402 from the cell plate 502 allows for the frame body to locate and orient a cell on framing members while reducing or preventing the frame body from interfering with a cell sealing with an adjacent cell.

For example, the cell-frame overmold material 517 may allow the cell plate 502 to rotate about the first horizontal axis 702 up to a pitch angle 708 of between +/−1 degree while the frame body 402 maintains a pitch angle of 0 degrees. Additionally, the cell-frame overmold material 517 may allow the cell plate 502 to rotate about the second horizontal axis 704 up to a roll angle 710 of between +/−1 degree while the frame body 402 maintains a pitch angle of 0 degrees. Additionally, the cell-frame overmold material 517 may allow the cell plate 502 to rotate about the vertical axis 706 up to a yaw angle 712 of between +/−1 degrees while the frame body 402 maintains a pitch angle of 0 degrees. In other aspects, the degree angle may be greater. For example, the degree angle of each angle of rotation may be +/−3. This may occur because the cell-frame overmold material is more flexible/elastic than the cell plate 502 and/or the frame body 402.

Similarly, the channel-frame overmold material 403 may allow the frame channel (414A, 414B, 414C, and/or 414D, for example) to move independently from the frame body 402. Such independent movement allows for, in embodiments, the frame body 402 to be manufactured thinner and less precisely with respect to flatness and thickness. That is, because the frame channels seal together, the manufacturing tolerances on the sealing elements of each frame channel in a plurality of frame channels must, in embodiments, be sufficiently high to reduce leaking of the electrolyte fluid. Decoupling the movement of the frame body 402 from the frame channels allows for the frame body 402 to locate and orient a cell on framing members while reducing or preventing the frame body from interfering with frame channel sealing. This may occur because the channel-frame overmold material is more flexible/elastic than the frame channel inserts and/or the frame body 402.

For example, the channel-frame overmold material 403 may allow the frame channel 414A to rotate about the first horizontal axis 702 up to a pitch angle 708 of between +/−1 degree while the frame body 402 maintains a pitch angle of 0 degrees. Additionally, the channel-frame overmold material 403 may allow the frame channel 414A to rotate about the second horizontal axis 704 up to a roll angle 710 of between +/−1 degree while the frame body 402 maintains a pitch angle of 0 degrees. Additionally, the channel-frame overmold material 403 may allow the frame channel 414A to rotate about the vertical axis 706 up to a yaw angle 712 of between +/−1 degrees while the frame body 402 maintains a pitch angle of 0 degrees. In other aspects, the degree angle may be greater. For example, the degree angle of each angle of rotation may be +/−3. It will be appreciated that overmolded frame channels 414B, 414C, and 414D may have the same or similar properties.

Figure 8:
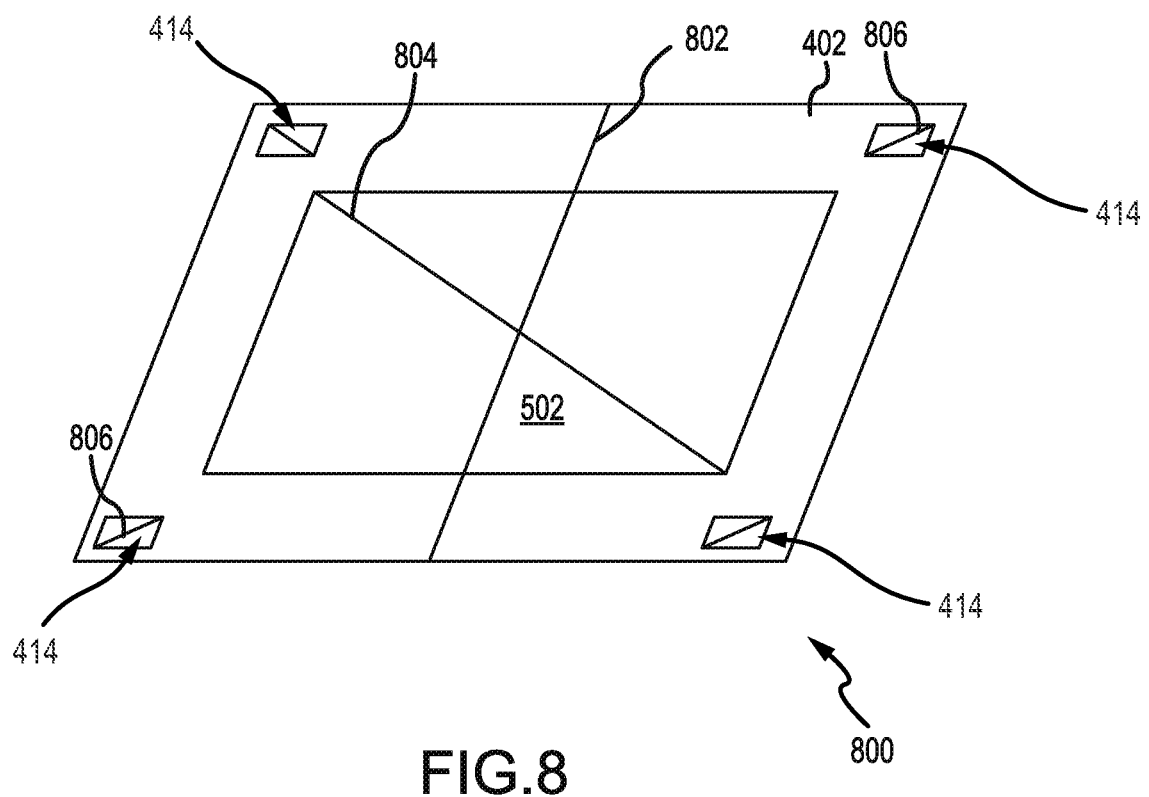
FIG. 8 illustrates a cross section view of a co-molded frame plate assembly.

FIG. 8 illustrates a perspective view of an overmolded frame plate assembly 800. It will be appreciated that elements of FIG. 8 that are like numbered as those elements previously discussed herein have the same or similar properties as those like numbered elements. As illustrated, overmolded frame plate assembly 800 includes an overmolded cell plate 502, overmolded frame channels 414, and a frame body 402.

A frame body flatness 802, a frame channel component flatness 806, and a cell plate flatness 804 are illustrated. A frame body flatness 802 measures the flatness of a frame body from one point of a frame body to another. As illustrated, the frame body flatness 802 is measured from one side of a face of the frame body 402 (which, as illustrated is a rectangular prism) to an opposite side on the same face of the frame body. Flatness may be described in millimeters of change in height versus millimeters of change in length. In aspects of the technology, the frame body may be manufactured to have a flatness 802 of greater than 0.005" per linear 1". In alternative embodiments, the frame body flatness 802 may have a flatness of greater than 0.005 mm per 1 mm.

Additionally illustrated is cell plate flatness 804, which measures the flatness of a cell from one point of a frame to another. As illustrated, the flatness is measured from one corner of a face of the cell plate 502 (which, as illustrated is a rectangular prism) to an opposite corner on the same face of the cell plate 502. Flatness may be described in millimeters of change in height versus millimeters of change in length. In aspects of the technology, the cell may be manufactured to have a flatness of at least 0.0005" per linear 1". In alternative/additional embodiments, the flatness may be at least 0.0005 mm per 1 mm.

Additionally illustrated is a frame channel component flatness 806, which measures the flatness of a frame channel component from one point of the component to another. As illustrated, the flatness is measured from one corner of the frame channel 414 to an opposite corner on the same face of the frame channel 414. Flatness may be described in millimeters of change in height versus millimeters of change in length. In aspects of the technology, the frame channel component flatness 806 may be manufactured to have a flatness of at least 0.0005" per linear 1". In alternative/additional embodiments, the flatness may be at least 0.0005 mm per 1 mm.

It will be appreciated that the choice of overmold material, such as cell-frame overmold material 517 described above, allows a plurality of cell or channels with a certain flatness tolerance to be coupled together, while the frames of each of the plurality of cells or channels may be maintained at a lower flatness tolerance.

Fig. is a method 900 for overmolding a component into a frame plate assembly. The process 900 includes operation 902, which involves providing an overmolding component. In aspects of the technology, the overmolding component may be one of a frame channel insert, an electrolyte pathway, or a cell plate as described herein. For example, the overmolded may be made via casting or another process.

Figure 10:
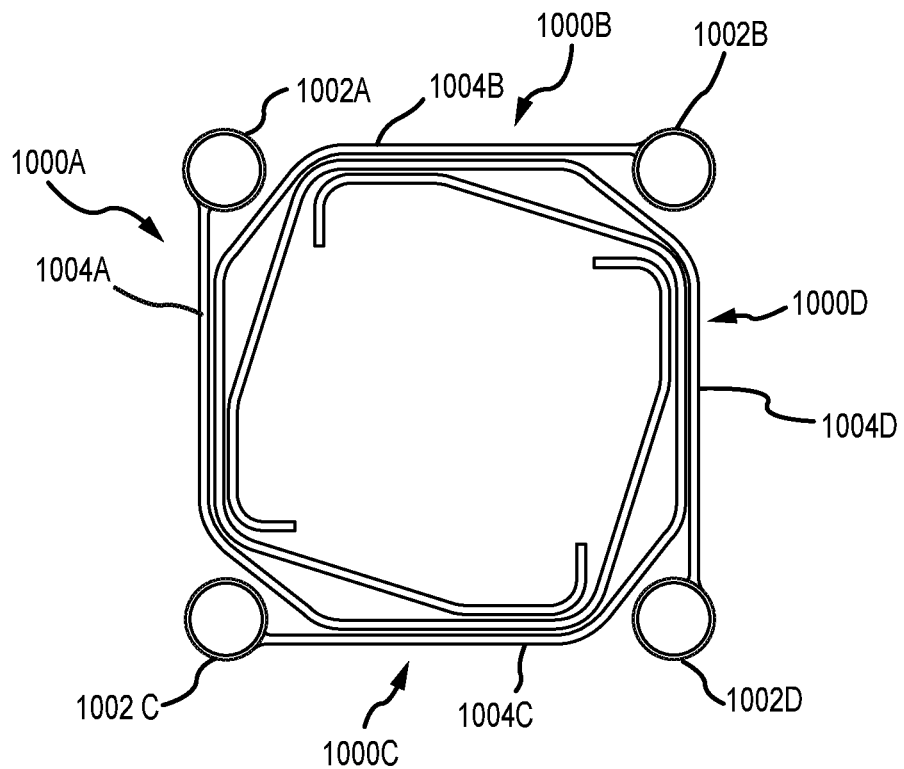
FIG. 10 illustrates four overmolded components in an arrangement for co-molding.

The operation then proceeds to operation 904 may further involve arranging one or more overmolding component. One arrangement is described with reference to FIG. 10. Four overmolding components 1000A, 1000B, 1000C, 1000D are illustrated in FIG. 10. The particular overmolding components are illustrated as having similar characteristics as those with respect to FIGS. 4-6 and/or 19-22, though they need not have such characteristics. In aspects of the technology, the overmolding components include frame channel portions 1002A, 1002B, 1002C, 1002D fluidically coupled to respective electrolyte pathway portions 1004A, 1004B, 1004C, 1004D. The obtained overmolding components 1000A, 1000B, 1000C, 1000D may be arranged in desired configuration, such as the configuration that the components will take in the frame. One or more portions of the obtained overmolded components 1000A, 1000B, 1000C, 1000D may be prepared to act as a substrate for an overmolding process. This may involve, for example, cleaning, treating, or otherwise preparing the overmolded components 1000A, 1000B, 1000C, 1000D for overmolding.

Figure 9:
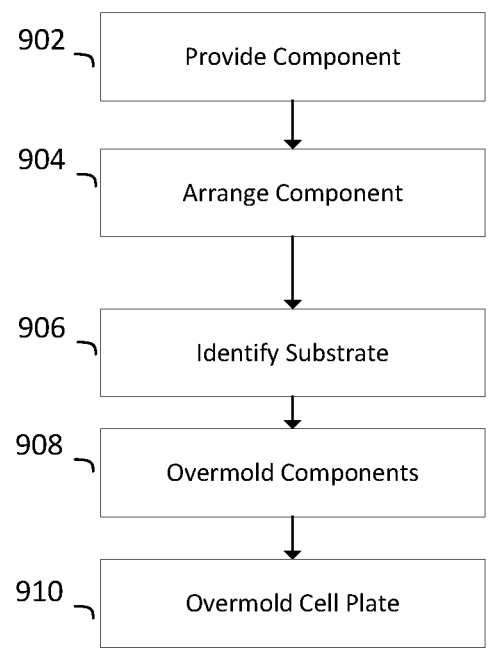
FIG. 9 is an example process for forming a co-molded frame plate assembly

Returning to FIG. 9, after the one or more overmolding components are provided, the process 900 may move to identify substrate operation 906. In aspects, a substrate may be a rectangular prism. In other aspects, the rectangular prism may have cutaways such that the overmolded components may insert into the substrate (an example of such an arrangement is provided in FIG. 14 as frame body 2008. The one or more overmolding components may be placed on a substrate, such as a semirigid or rigid of rectangular prism for form an overmold assembly. The overmold assembly may then be placed within a mold or other apparatus operable to overmold the substrate.

Operation 900 then proceeds to overmold operation 906. Overmolding may occur via a variety of means, including plastic injection molding or some other means. The apparatus may then be used to mold a frame (e.g., frame 400) to join the overmolding components. The overmold assembly may, but need not, be overmolded using different materials (i.e., the overmold material) from the overmolding component and/or substrate. In an example, the overmolding components may be made from a relatively inflexible material (e.g., inflexible resins, plastics, graphite, etc.), while the frame may be overmolded using a flexible material to provide overall tolerance (e.g., float) to the resulting frame assembly. After the overmolding process occurs, an area for the cell plate and/or holes adapted to receive framing members may be bored out.

Figure 11:
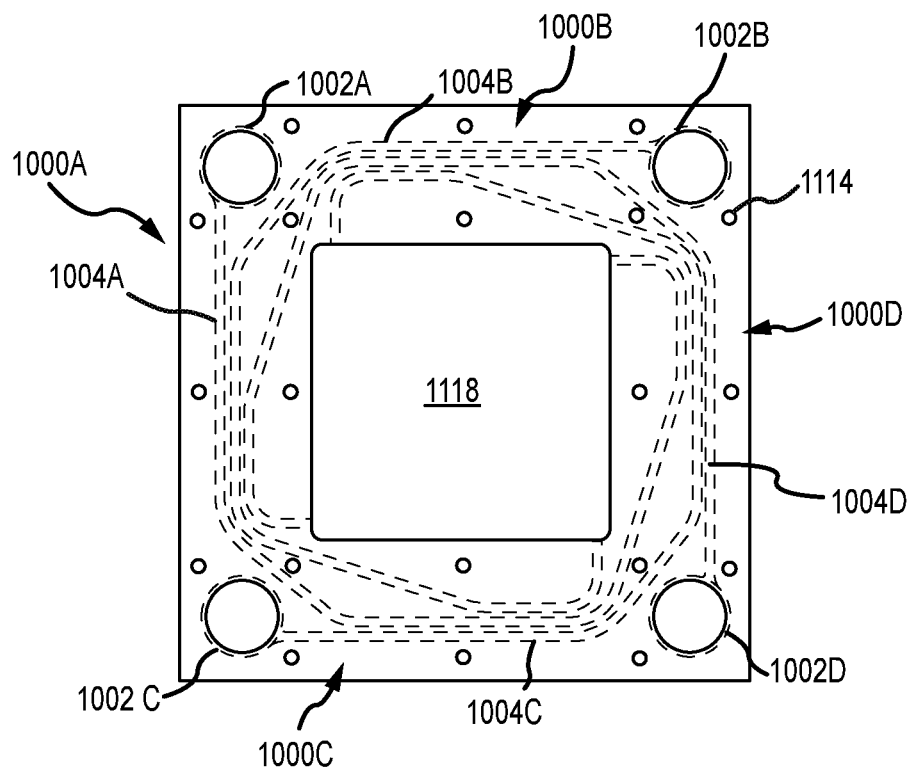
FIG. 11 illustrates an example result of an overmolding process.

FIG. 11 illustrates an example of the result of the overmold assembly has been overmolded. As illustrated, FIG. 11 includes frame channel portions 1002A, 1002B, 1002C, 1002D fluidically coupled to respective electrolyte pathway portions 1004A, 1004B, 1004C, 1004D. The obtained overmolding components 1000A, 1000B, 1000C, 1000D may be arranged as shown on a substrate 1102. As illustrated, bores 1114 and cell-plate area 1118 are adapted to receive a cell and framing members respectively.

Operation 900 then optionally proceeds to overmold cell operation 908. In operation 908, a cell plate is placed within the cell plate area 1118 to form a cell-plate overmold assembly. The overmold cell-plate assembly may then be overmolded via plastic injection method or another method.

Figure 12:
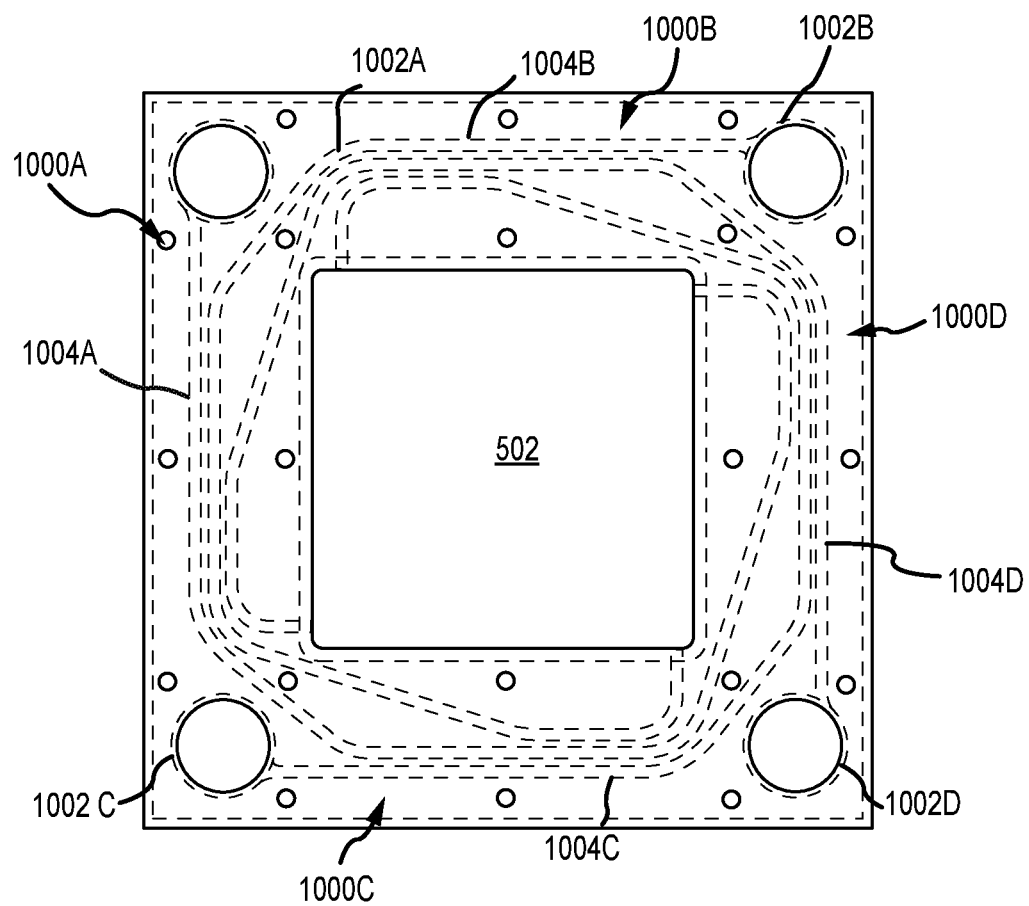
FIG. 12 illustrates an example where the overmolding process includes a cell plate.

FIG. 12 illustrates an example embodiment of a frame plate assembly 1200 that includes an overmolded cell plate 502. In aspects, this may be formed using the method described in operation 908. For example, following the overmolding of overmold-assembly of FIG. 11, a cell plate 502 may be inserted in the cell-plate area 1118 and coupled to the electrolyte pathways 1004A, 1004B, 1004C, 1004D. The frame 1120 and the cell plate 502 may then be used as a substrate for an overmolding process that applies an overmolding material over the cell plate 502. The dashed lined 1202 indicates the edge of the cell plate, which is now not visible and is embedded in the body of the resulting frame-plate assembly. The overmolding material may robustly seal the connection between the cell plate 502 and the electrolyte pathways 1004A, 1004B, 1004C, 1004D without the need for additional sealing components, such a O-rings. In some examples, the overmolding material 1204 may contribute to an overall float of the cell plate 502 relative to the frame 1120.

Figure 13:
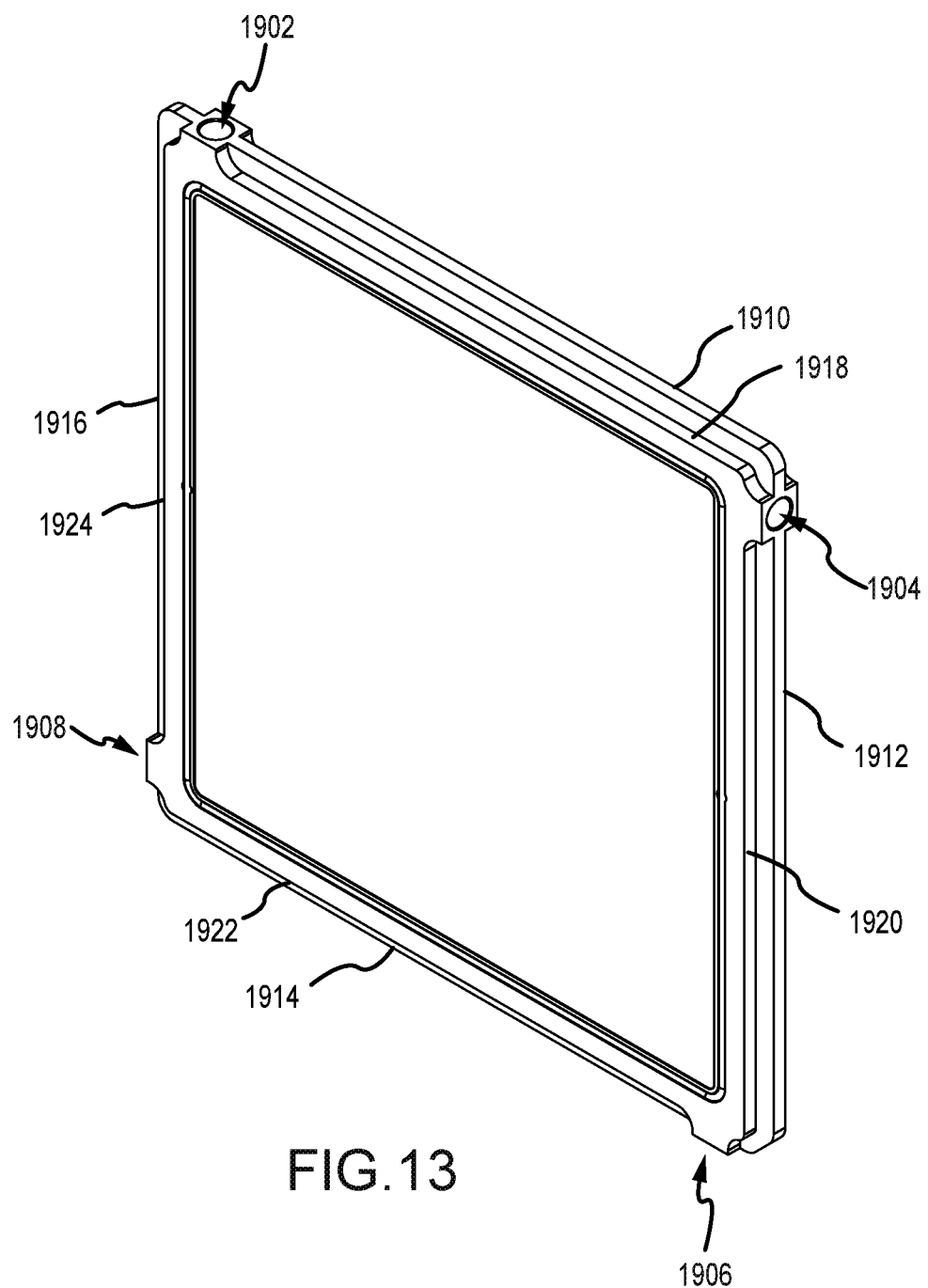
FIG. 13 illustrates an exploded view of an embodiment of a frame plate assembly with various components that may be overmolded.

FIG. 13 illustrates a perspective view of a cell plate 1900, which may be overmolded into a frame plate assembly. In aspects of the technology, the cell plate 1900 includes a first orifice 1902, a second orifice 1904, a third orifice 1906, and a fourth orifice 1908. As illustrated the first orifice 1902, the second orifice 1904, the third orifice 1906, and the fourth orifice 1908 are circular in shape. In aspects of the technology, the orifice may be adapted to receive a joining member, such as the joining members described herein. For example, where the joining member is threaded, the first orifice may have threads about an inner annular surface. Where the joining member is a cylindrical tube or nipple and has a number of flanges extending radially outward from the cylinder, the inner annular surface may have a corresponding ridge, which may receive the flanges of the cylindrical tubing or nipple. Additionally or alternatively, the nipple of the joining member may be tapered such that the joining member may be insertably removed from an orifice, such as a first orifice 1902.

As illustrated, the cell plate is a rectangular prism with a front face and a back face. The cell plate may be coupled to a redox flow battery through the use of joining members. For example, a joining member may couple to an orifice, such as the first orifice 1902, the second orifice 1904, the third orifice 1906, and the forth orifice 1908, and fluidically couple the cell plate 1900 to an electrolyte reservoir and or other cells within a cell stack.

In aspects of the technology, the cell plate 1900 includes one or more heat exchange elements. For example, a first heat exchange element 1910 may be coupled to a first wall 1918, a second heat exchange element 1912 may be coupled to a second wall 1920, a third heat exchange element 1914 may be coupled to a third wall 1922, and a fourth heat exchange element 1916 may be coupled to a fourth wall 1924. As illustrated, the heat exchange element is a fin that protrudes from a wall and runs length-wise along the wall. In other embodiments, the heat exchange element may be a series of teeth or other structure that aids in dissipating heat from the cell plate 1900.

FIG. 14 illustrates an exploded view of an embodiment of a frame plate assembly 2000 with various components that may, in aspects, be overmolded. As illustrated, FIG. 14 includes overmold component members 2002A, 2002B, 2002C, and 2002D. It will be appreciated that elements of FIG. 14 having like numbered as elements previously described will have the same or similar properties as those like numbered elements. As illustrated, the frame plate assembly 2000 includes a cell plate 502, joining members 512A, 512B, 512C, and 512D, a frame body 402, and overmold component electrolyte pathways 608A, 608B, 608C, and 608D.

Additionally illustrated are overmolded components 2002A, 2002B, 2002C, and 2002D. The overmold components 2002A, 2002B, 2002C, and 2002D may be placed into the frame channel area 2004A, 2004B, 2004C, and 2004D of the frame body 2008 in preparation for overmolding. As illustrated, each of the overmolded components 2002A, 2002B, 2002C, and 2002D is a rectangular prism, though they need not be. For example, other geometries are contemplated, including cylindrical shapes.

In aspects of the technology, the overmolded components 2002A, 2002B, 2002C, and 2002D and the frame channel area 2004A, 2004B, 2004C, and 2004D form all or a part of a frame channel when the overmolded components 2002A, 2002B, 2002C, and 2002D are inserted into their respective frame channel areas and overmolded.

Examples of overmolded components 2002A, 2002B, 2002C, and 2002D are discussed further with reference to FIGS. 15A-15D.

FIGS. 15A-15D illustrate various views of an embodiment of frame channel overmolded components. In particular, FIG. 15A, FIG. 15B, FIG. 15C, and FIG. 15D illustrate a front, side, perspective, and back view of a frame channel overmolded component is a radial connector insert 2100, respectively. A radial connector insert 2100 may be used to allow an electrolyte solution to flow from one frame channel of a first frame plate assembly to a second frame channel of an adjacent, second frame plate assembly. Additionally, the radial connector insert 2100 includes a connection element 2102 which, in operation, fluidically couples a cell of the frame plate assembly to other frame plate assemblies and/or an electrolyte reservoir. As illustrated, radial connector insert 2100 includes a rectangular prism insert body 2103. In other aspects, the body 2103 may be a different shape.

As illustrated, the radial connector insert 2100 has an opening 2110 that allows, in aspects, an electrolyte to flow from one frame plate assembly to another frame plate assembly and/or to an electrolyte reservoir. Indeed, each radial connector insert 2100 may have a sealing element 2112 that protrudes from a front face 2114 of the radial connector insert 2100 and may be adapted to couple to a back face 2116 of an adjacent frame channel component. As illustrated, the sealing element 2112 protrusion is defined by a perimeter of the opening 2110. The protrusion has a face 2118 that may be substantially planar. In some aspects, the face 2118 of the sealing element 2112 may couple to an O-ring or other material to aid in forming a robust seal with an adjacent frame channel.

An attachment element 2120 may correspond to a receiving element of a frame, such as the frame described with reference to FIG. 14. For example, an attachment element 2120 may be a tongue that protrudes from a side wall of the radial connector insert 2100 and inserts into a slot of the frame. In other aspects, other attachment elements may be used, such as snap fittings. This may allow the radial connector insert 2100 to be removably inserted into the frame body of a frame plate. This may aid in keeping the overmold component in place during over molding.

Additionally illustrated is a connection element 2102. As illustrated, the connection element 2102 extends orthogonally from the first wall 2122 of the body 2103. In aspects of the technology, the connection element 2102 may be a tube with a press fit, snap fit, threaded connection or other connection such that the connection element resiliently engages with a frame end of an electrolyte pathway, such as an anolyte or catholyte pathway described with more detail above. In aspects, this allows the frame channel to be in fluidic communication with one or more cell plates. For example, in aspects, the connection element 2102 has a pathway 2124 that fluidically couples the opening 2110 to a cell of a frame plate assembly when in operation. Specifically, the opening 2110 may be defined by an annular wall 2126. Additionally, the pathway 2124 may be through the body 2103 to opening on the annular wall 2126.

FIGS. 16A-16D illustrate various views of an embodiment of an overmolded component. In particular, FIG. 16A, FIG. 16B, FIG. 16C, and FIG. 16D illustrate a front, side, perspective, and back view of an overmolded component that is a radial spacer insert 2200. A radial spacer insert 2200 may be used to allow an electrolyte solution to flow from one frame channel of a first frame plate assembly to a second frame channel of a second frame plate assembly. As illustrated, a radial spacer insert 2200 includes a rectangular prism insert body 2202. In other aspects, the body 2202 may be a different shape.

As illustrated, the radial spacer insert 2200 has an opening 2210 that allows, in aspects, an electrolyte to flow from one frame plate assembly to another, adjacent frame plate assembly. Indeed, a radial spacer insert 2200 may have a sealing element 2212 that protrudes from a front face 2214 of the radial spacer insert 2200 and may be adapted to couple to a back face 2216 of another overmolded component. As illustrated, the sealing element is a protrusion, which protrusion is defined by a perimeter of the opening 2210. The protrusion has a face 2218 that may be substantially planar. In some aspects, the face 2218 of the sealing element 2212 may couple to an O-ring or other material to aid in forming a robust seal with an adjacent frame channel.

An attachment element 2220 may correspond to a receiving element of a frame, such as the frame described with reference to FIG. 14. For example, an attachment element 2220 may be a tongue that protrudes from a side wall and inserts into a slot of the frame. In other aspects, other attachment elements may be used, such as snap fittings. This may allow the radial spacer insert to be insertably removable into the frame body of a frame plate. In some aspects, this may allow for the overmolded component to be held in place during the overmolding process.

Frame plate assemblies (e.g., frame plate assembly 502), components thereof, and other aspects of technologies described herein may be created in a variety of manners. In an embodiment, the pathways of a flow battery (e.g., electrolyte pathway 608) are made from tubing placed into spaces in a frame. For instance, the frame may include channels, troughs, conduit hangers, or other components for holding tubing relative to the frame. The tubing or other electrolyte pathways may be separate from and connectable to frame channel members that fluidically couple the frame plate assembly to other frame plate assemblies and/or an electrolyte reservoir (e.g., radial connector insert 2200). The pathways may facilitate transport of fluid from the frame channel members to a cell plate (e.g., cell plate 502) of the frame plate. Connections may be made between the pathways and the frame channel members using any of a variety of connection mechanisms, and O-rings (or other sealing components) may be used to facilitate a seal between the components.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

What is claimed is:

1. A frame plate assembly comprising:
   a frame having a frame body made of frame body material;
   a plurality of electrolyte pathways disposed within the body;
   a plurality of joining members, wherein the plurality of electrolyte pathways couple to a cell plate via the joining members, which are configured to extend at least partially within the plurality of electrolyte pathways and to fluidically couple the plurality of electrolyte pathways to the cell plate;
   the cell plate having a front face, wherein at least a portion of the front face has been overmolded with the frame body material such that an overmolding frame body material covers the plurality of joining members and at least a portion of the front face and couples to the frame body; and
   wherein the overmolding frame body material forms a seal between the cell plate and the plurality of the electrolyte pathways.

2. The frame assembly of claim 1, wherein the portion is defined by a perimeter of the front face of the cell plate.

3. The frame plate assembly of claim 1, wherein the electrolyte pathways are a tubular shape.

4. The frame plate assembly of claim 1, wherein the overmolding frame body material allows the cell plate to rotate by at least 1 degree about an axis independently from the frame of the frame plate assembly.

5. The frame plate assembly of claim 1, wherein the cell plate is more rigid than the overmolding frame body material.

6. The frame plate assembly of claim 1, further comprising a cell plate flatness of 0.0005 millimeters per linear inch; and a frame plate flatness of 0.0005 inches per linear inch.

7. The frame plate assembly of claim 3, wherein each joining member comprises a tubular member configured as a nipple or configured as a press fit, a snap fit or a threaded connection.

8. The frame plate assembly of claim 7, wherein each joining member resiliently engages with the cell plate.

9. The frame plate assembly of claim 7, wherein the cell plate includes a plurality of receiving elements configured to receive the tubular joining member.

10. The frame plate assembly of claim 3, wherein each joining member comprises tubing configured as a nipple having one or more flanges extending radially out from the tubing, the one or more flanges configured to resiliently engage with an inner surface of an orifice of a cell plate.

11. The frame plate assembly of claim 10, wherein each joining member includes plural flanges configured to be received by at least one corresponding ridge in an orifice of the cell plate.

12. The frame plate assembly of claim 7, wherein each joining member includes a threaded surface configured to be received in corresponding threads of an inner annular surface of an electrolyte pathway of the cell plate.

13. The frame plate assembly of claim 3, wherein the plurality of joining members are incorporated into the cell end of the plurality of electrolyte pathways.

* * * * *